Patented Nov. 3, 1931

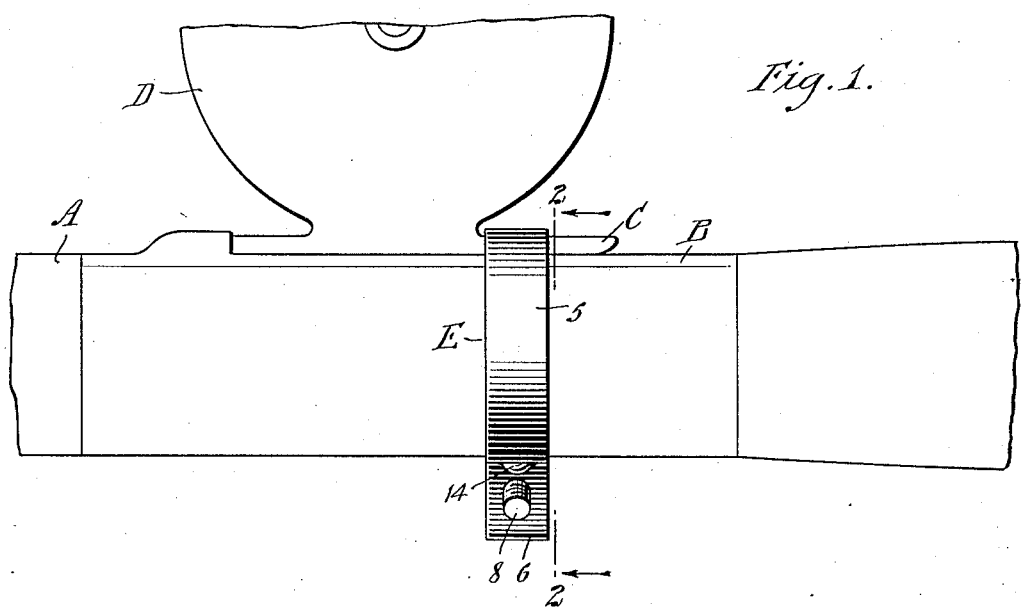
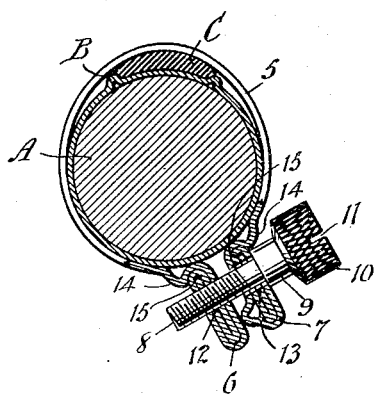
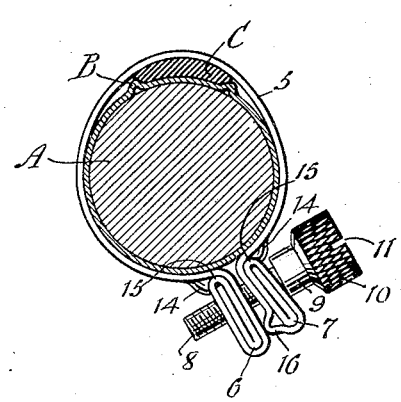

1,830,558

UNITED STATES PATENT OFFICE

JOHN OLSON, OF BROOKLYN, NEW YORK, ASSIGNOR TO OLSON BROS. SAW MANUFACTURING CO., INC., OF BROOKLYN, NEW YORK, A CORPORATION OF NEW YORK

CLAMP

Application filed May 18, 1931. Serial No. 538,297.

This invention relates generally to clamps, and has particular reference to a clamp of the split ring type which, while not restricted to such use, is especially designed for the purpose of clamping a fishing reel on the reel seat of a rod to insure against accidental displacement of the reel.

The present invention aims for one of its principal objects to provide a clamp of the split ring type which more effectually grips about the object or objects to be clamped, by virtue of means on the ears which causes the inner ends of the ears to be moved relatively closer to each other as the clamping means is tightened.

The invention further resides in the provision of a clamp of the indicated character, in which the ears are formed by doubling or bending the terminals of the split ring or band upon themselves to obtain the desired thickness and strength, and in which integrally formed means is provided for retaining the double or folded ear forming portions in the proper shape and against unfolding without the use of soldering, welding or other expensive processes of this nature.

Other objects of the invention reside in the comparative simplicity of construction and mode of use of the clamp, the economy with which the same may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 illustrates the clamp in use in connection with a fishing reel and rod, which is one of its principal applications.

Figure 2 is a transverse sectional view taken approximately on the line 2—2 of Figure 1, with parts of the clamp broken away and shown in section to disclose the underlying structure.

Figure 3 is a view similar to Figure 2 illustrating the final clamping action of the device.

Referring to the drawings by characters of reference, A designates a fishing rod having the usual reel seat B upon which the base C of the reel D is seated, while E designates generally the improved clamp.

The clamp E is fashioned from a single length of flat elongated resilient sheet material, the medial portion 5 of which is bent into substantially ring or band form and the opposite terminals 6 and 7 of which extend outwardly and are reversely folded successively to provide a plurality of flat convolutions disposed in flat contact with each other to obtain the desired thickness, strength and rigidity essential to the proper functioning of the terminals 6 and 7 as ears for the reception therethrough of a suitable clamping means. In the present instance, the clamping means consists of a screw having a threaded shank 8 having an enlarged body 9 at one end, which body is formed with a further enlarged knurled head 10 provided with a kerf 11. The ear or terminal 6 is formed with a threaded aperture 12 designed to accommodate the threads of the threaded shank 8, while the opposite terminal or ear 7 is formed with a non-threaded opening 13 of slightly larger diameter than the threaded shank and of lesser diameter than the body 9. In practice, it is to be understood that in lieu of the screw which extends through one of the ears and threadedly engages the other as shown, any equivalent, such as a bolt and nut, may be employed if desired. In order to retain the convolutions or folds of the terminals or ears 6 and 7 against the possibility of relative separation without resorting to soldering, welding, riveting or other similar expensive processes, the medial portion 5 at the juncture with the terminals 6 and 7 is provided with outstruck projections 14 which are disposed in a proper position to engage with the bights 15.

In order to insure a proper and effectual circumferential contraction of the medial portion, means is provided which cooperates with the terminals or ears 6 and 7 to set up a relative inward movement of the inner ends of the ears toward each other as the screw or equivalent device 8 is tightened. As illustrated, this means consists in providing the ear 7 adjacent its outer end with a lateral offset 16 on its inner surface, which acts as a fulcrum engaging with the inner surface of the other ear 6. As shown, the offset 16 constitutes merely a deformed or deflected portion of one of the convolutions of the stock or material from which the ear is formed.

While there has been illustrated and described a single and preferred embodiment of the invention, it is to be clearly understood that no limitation is intended to the precise structural details, and that variations and modifications which properly fall within the scope of the appended claims may be resorted to when desired.

What is claimed is:

1. A split clamp ring fashioned from a length of resilient material having its opposite ends doubled upon themselves to provide flat contacting convolutions defining relatively thick radially projecting ears for receiving therethrough means to effect circumferential contraction of the ring and upstruck detent means on the ring at the juncture of the ears therewith, said detent means engaging with the bight of the outer convolution of each ear to prevent relative movement of said ear forming convolutions.

2. A split clamp ring fashioned from a single length of resilient material to provide a substantially annular portion and outwardly projecting extremities reversely bent successively outward upon themselves into a series of flat contacting convolutions providing relatively thick outwardly projecting ears for receiving therethrough means to effect circumferential contraction of the annular portion and outstruck detents on the annular portion at its juncture with the ears engaging with the ear forming convolutions to retain the same in flat contact.

3. A split clamp ring fashioned from a single length of resilient material to provide a substantially annular portion and outwardly projecting extremities reversely bent successively outward upon themselves into a series of flat contacting convolutions providing relatively thick outwardly projecting ears for receiving therethrough means to effect circumferential contraction of the annular portion, outstruck detents on the annular portion at its juncture with the ears engaging with the ear forming convolutions to retain the same in flat contact and an offset formed on the confronting face of one of the ears adjacent its outer free end for engagement with the other ear to cause relative movement of the inner ends of the ears toward each other upon circumferential contraction of the annular portion by said contracting means.

4. A split clamp ring including outwardly projecting ears at the opposite ends of the annular portion thereof, means engaging with the ears for effecting circumferential contraction of the annular portion and means formed on one of the ears and engaging the other for causing a relative rocking toward each other of the inner ends of the ears at their juncture with the annular portion.

Signed at New York city, in the county of New York and State of New York, this 15th day of May, 1931.

JOHN OLSON.